(12) United States Patent
Vicars

(10) Patent No.: US 7,909,057 B1
(45) Date of Patent: Mar. 22, 2011

(54) VALVE INSERT

(76) Inventor: Berton L. Vicars, Ruidoso, NM (US)

( * ) Notice: Subject to any disclaimer, the term of this patent is extended or adjusted under 35 U.S.C. 154(b) by 0 days.

(21) Appl. No.: 12/592,648

(22) Filed: Dec. 1, 2009

(51) Int. Cl.
*F16K 15/06* (2006.01)

(52) U.S. Cl. .................. 137/516.29; 251/332; 251/334; 251/357; 277/489

(58) Field of Classification Search .......... 251/332, 251/333, 334, 357, 366; 137/516.29, 902; 277/489

See application file for complete search history.

(56) References Cited

U.S. PATENT DOCUMENTS

| | | | | |
|---|---|---|---|---|
| 3,742,976 | A | * | 7/1973 | Bailey ............................ 251/332 |
| 4,180,097 | A | * | 12/1979 | Sjoberg ..................... 137/516.29 |
| 4,951,707 | A | * | 8/1990 | Johnson ..................... 137/516.29 |
| 5,249,600 | A | | 10/1993 | Blume |
| 5,345,965 | A | | 9/1994 | Blume |
| 6,955,181 | B1 | | 10/2005 | Blume |
| 6,955,339 | B1 | | 10/2005 | Blume |
| 7,168,440 | B1 | | 1/2007 | Blume |

* cited by examiner

*Primary Examiner* — John Bastianelli
(74) *Attorney, Agent, or Firm* — Stephen R. Greiner

(57) ABSTRACT

A valve insert including a ring made of a resilient material. The ring has a shape that is defined by the rotation of an irregular polygon around a central axis. Superposing a quadrilateral and a circle forms the irregular polygon.

1 Claim, 4 Drawing Sheets

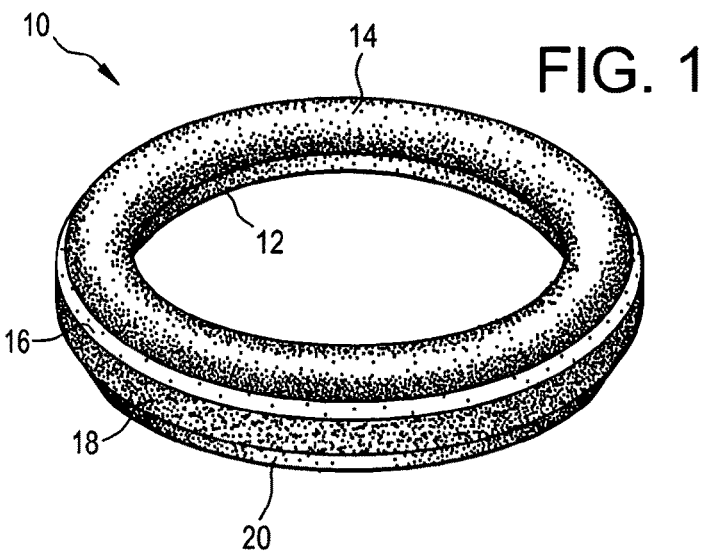
FIG. 1
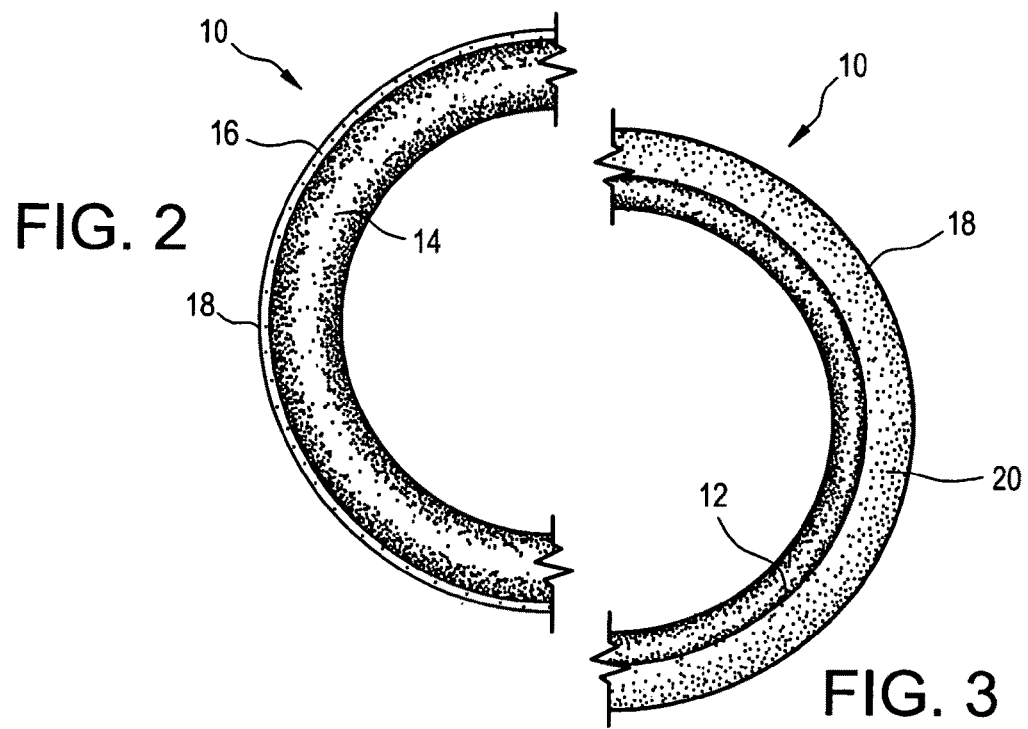
FIG. 2
FIG. 3
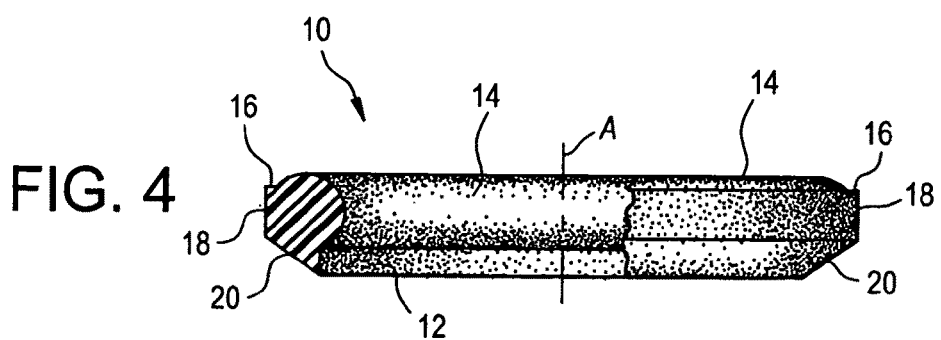
FIG. 4

US 7,909,057 B1

VALVE INSERT

FIELD OF THE INVENTION

The present invention relates generally to fluid handling apparatus and, more particularly, to direct response valves of reciprocating type.

BACKGROUND OF THE INVENTION

Hydraulic fracturing can increase the rate of production of oil and gas from low-permeability reservoirs. Hydraulic fracturing increases the permeability of reservoir rocks by opening channels through which oil and gas can travel to recovery wells. During hydraulic fracturing, a fluid is pumped through a wellbore under high pressure into a subterranean reservoir where it splits or fractures the reservoir rock. A proppant, like sand, is often added to the pumped fluid and carried in suspension into the newly formed fractures. When pumping ceases, the fractures partially close on the proppant, leaving open channels for oil and gas to flow to a recovery well that is usually the well through which the fracture fluid was pumped.

High-pressure pumps are used to complete hydraulic fracturing procedures or "frac jobs." These pumps have "fluid ends" within which a number of reciprocating plungers pressurize a fracture fluid. Suction and discharge valves control fluid flow to, and from, the plungers. Within these valves are pistons that normally press against valve seats to selectively stop the flow of fluid. When the pressure within a suction valve is reduced below a predetermined threshold, its piston will move away from its seat thereby permitting fluid to enter a fluid end. Similarly, when the pressure within a discharge valve is raised above a predetermined threshold, its piston will move away from its seat thereby permitting fluid to exit a fluid end.

To reduce leaks around valve seats and maximize pumping efficiencies, the pistons found in suction and discharge valves are typically equipped with sealing elements. These sealing elements or inserts are typically rings formed of a resilient material. The rings are fitted into grooves in the pistons that are positioned to facilitate contact with valve seats. Typical designs of sealing elements have permitted them to move about in their retaining grooves after installation, permitting them to wear excessively in the presence of abrasive proppants and other materials carried by fracture fluids. Thus, the known sealing elements required frequent replacement Pump manufacturers have made few provisions in their pumps for replacing worn parts in suction and discharge valves. Sealing elements are located deep within the fluid end of a pump that is held together by a large number of heavy, threaded fasteners. To access the worn sealing elements, the fluid end frequently required substantial disassembly. Although manufacturers provide strong and robust pumps, disassembly of pumps in the field is especially time-consuming and difficult to perform. Increasing the longevity of the sealing elements found in suction and discharge valves can, therefore, provide substantial cost savings to an oilfield operator.

SUMMARY OF THE INVENTION

In light of the problems associated with the sealing elements used in pumps for hydraulic fracturing purposes, it is a principal object of the invention to provide a valve insert for attachment to the movable piston of a suction valve or a discharge valve that does not slide, roll or pivot once installed. Furthermore, my valve insert channels fluid around its exterior surfaces with minimal turbulence and wear from abrasive fluids. As a result, the valve insert has a greater service life than that of any known sealing element.

It is an additional object of the invention to provide a valve insert that can be interchangeably used in either a suction valve or a discharge valve thus reducing the inventory of parts that a pump operator must keep on hand for repairs.

It is another object of the invention to provide a valve insert of the type described that is easily installed in a valve with neither specialized tools nor prolonged training being required to accomplish the task.

It is a further object of the invention to provide a valve insert of the type described that "snap fits" into the valve to which it is installed. A proper fit can be felt, seen, and heard.

Still another object of the invention is to provide a valve insert that features large, load-bearing surfaces that promote a good seal and minimize cyclical loading stresses as a valve opens and closes.

It is an object of the invention to provide improved features and arrangements thereof in a valve insert for the purposes described which is lightweight in construction, inexpensive to manufacture, and fully dependable in use.

Briefly, my valve insert achieves the intended objects by featuring a ring made of a resilient material like a durable plastic. The ring has a shape that is defined by the rotation of an irregular polygon around a central axis. Superposing a quadrilateral and a circle forms the irregular polygon.

The foregoing and other objects, features, and advantages of my valve insert will become readily apparent upon further review of the following detailed description of my insert that is illustrated in the accompanying drawings.

BRIEF DESCRIPTION OF THE DRAWINGS

My valve insert is more readily understood with reference to the accompanying drawings, in which:

FIG. 1 is a perspective view of my valve insert.

FIG. 2 is a top view of the valve insert of FIG. 1 with its right-hand portion broken away.

FIG. 3 is a bottom view of my valve insert with its left-hand portion broken away.

FIG. 4 is a side elevational view of my valve insert with portions broken away to reveal details thereof.

Similar reference characters denote corresponding features consistently throughout the accompanying drawings.

DETAILED DESCRIPTION OF THE INVENTION

Figure 5:
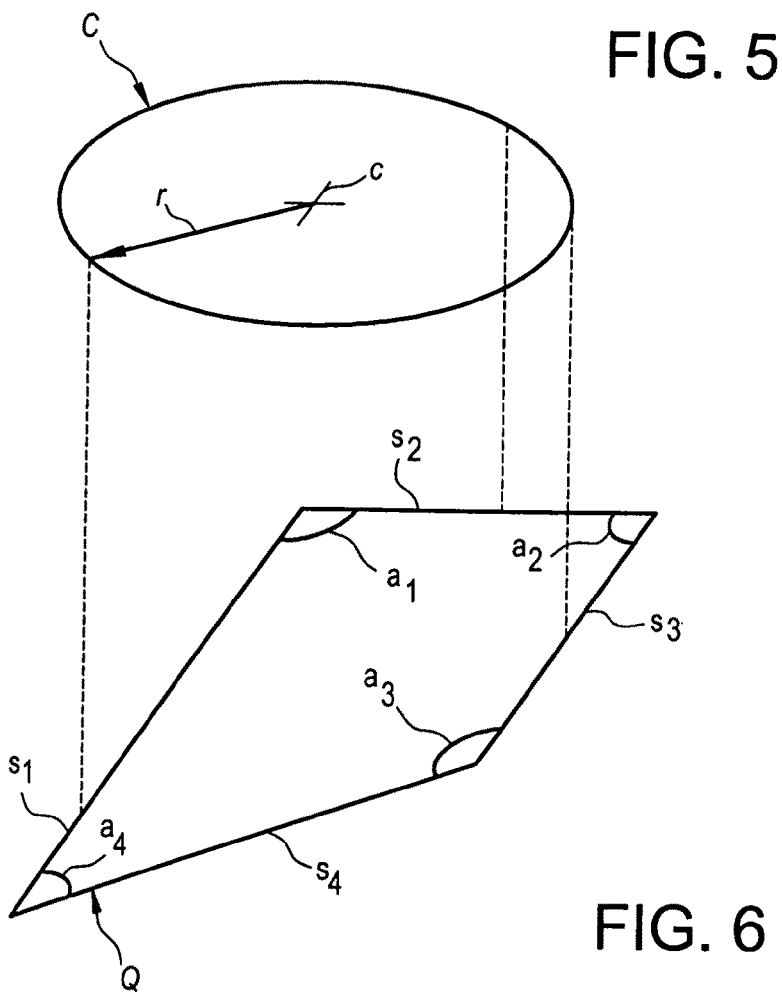
FIG. 5 is an exploded, perspective view of the circle and quadrilateral that are superposed to form the polygon that defines the cross section of the valve insert.
Figure 6:
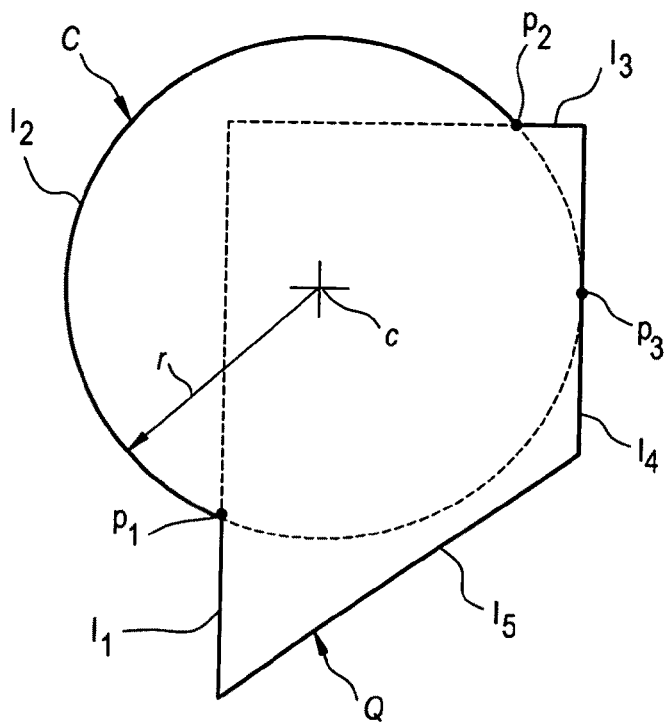
FIG. 6 is the polygon that is rotated about a vertical axis so as to form the valve insert.

In the FIGS., my valve insert is shown generally at 10. Valve insert 10 is a ring, made of a durable plastic or other suitable, resilient material, whose shape is defined by the rotation of an irregular polygon P around a central axis A. The superposing of a quadrilateral Q and a circle C forms polygon P.

Quadrilateral Q is a plane figure having four sides $s_1$, $s_2$, $s_3$, and $s_4$ and four angles $a_1$, $a_2$, $a_3$, and $a_4$. Sides $s_1$ and $s_3$, measuring 0.876 inches and 0.499 inches in length respectively, are arranged parallel to one another. Side $s_2$ is 0.519 inches long and connects sides $s_1$ and $s_3$ together. Side $s_2$ meets side $s_1$ at an angle $a_1$ of 90° and, also, meets side $s_3$ at an angle $a_2$ of 90°. Also, side $s_4$, measuring about 0.641 inches in length, is positioned opposite side $s_2$ and connects sides $s_1$ and $s_3$ together. Side $s_4$ meets side $s_3$ at an angle $a_3$ of about 135° and, also, meets side $s_1$ at an angle $a_4$ of about 55°.

Circle C is a closed plane curve consisting of all points equally distant from a point within it, called the center c. The distance from center c to the closed plane curve is the radius r of circle C. Radius r measures about 0.375 inches in length.

When superposed, center c is positioned within the bounds of quadrilateral Q, i.e., the area bounded by sides $s_1$, $s_2$, $s_3$, and $s_4$, with portions of circle C extending beyond the bounds of quadrilateral Q. Quadrilateral Q and circle C touch one another at three points $p_1$, $p_2$, and $p_3$. Circle C crosses side $s_1$ at point $p_1$ at a shallow angle and crosses side $s_2$ at point $p_2$ at another shallow angle. Circle C touches, but does not cross, side $s_3$ at point $p_3$ near the midpoint of side $s_3$.

Polygon P is defined by five line segments $l_1$, $l_2$, $l_3$, $l_4$, and $l_5$. Line segment $l_i$ is a portion of side $s_1$ adjoining side $s_4$ and measuring about 0.279 inches in length. Line segment $l_2$ is an arc of circle C measuring about 1.374 inches in length. Line segment $l_3$ is a portion of side $s_2$ adjoining side $s_3$ measuring about 0.125 inches in length. Line segment $l_3$ and side $s_3$ fully coincide in terms of length and location as do line segment $l_4$ and side $s_4$.

Rotating polygon P around central axis A provides valve insert 10 with its outer surfaces. One surface arising from the rotation of line segment $l_1$ is a circular, inside wall 12 that extends vertically upward from the bottom of valve insert 10 and opens toward the interior of valve insert 10. Similarly, the rotation of line segment $l_2$ around axis A produces a convex, top wall 14 that projects, at first, upwardly and inwardly from the top of inside wall 12, then, projects upwardly and outwardly and, finally, arches outwardly and downwardly from its crest. Also, the rotation of line segment $l_3$ around axis A results in valve insert 10 being provided with a round, wing wall 16 that projects horizontally outward from the outer periphery of top wall 14. Further, rotating line segment 14 around axis A generates a circular, outside wall 18 that projects downwardly from wing wall 16 and parallels inside wall 12. Finally, rotating line segment $l_5$ around axis A produces a circular, bottom wall 20 that slopes downwardly and inwardly from the bottom of outside wall 18 to join the bottom of inside wall 12.

Figure 7:
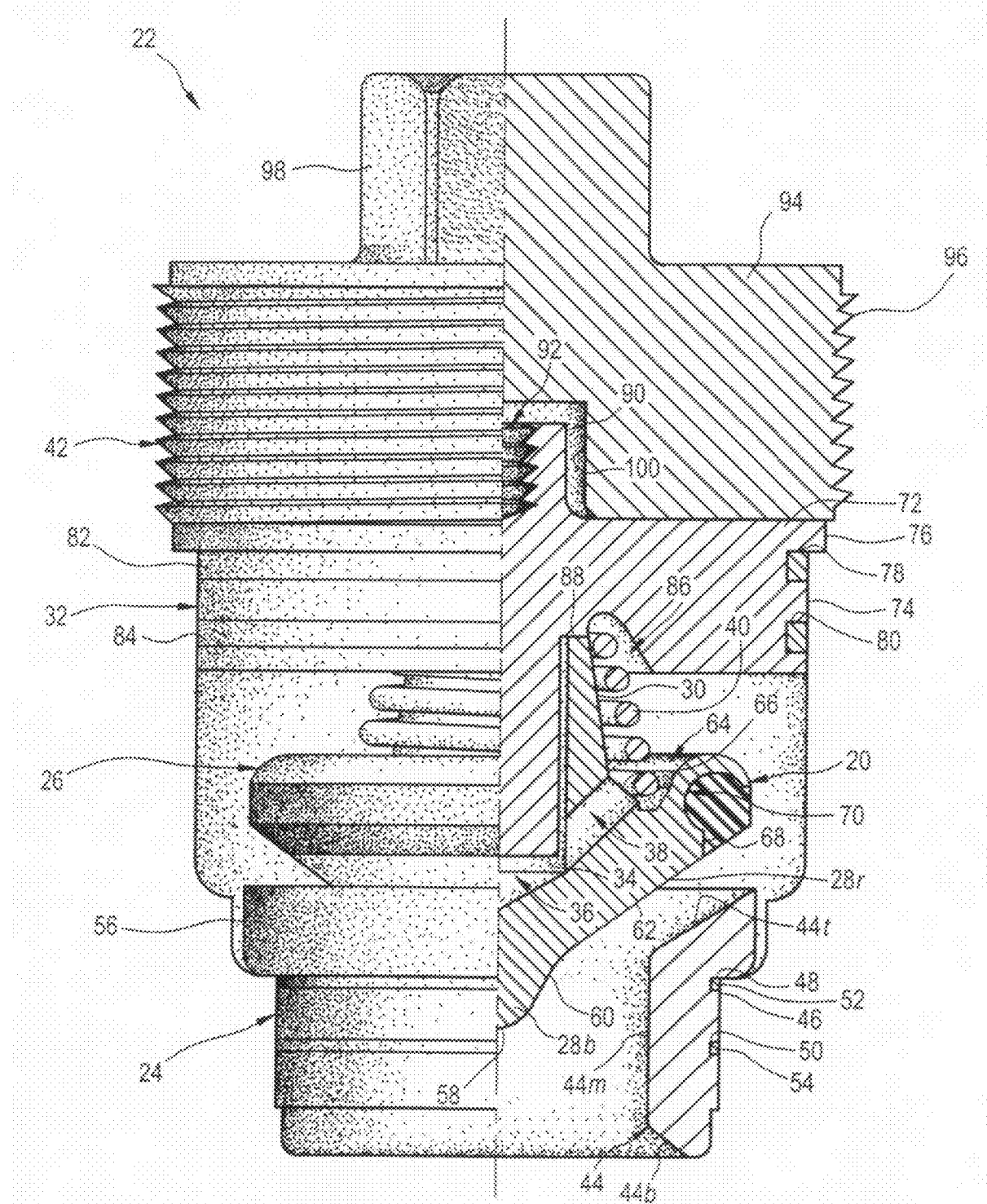
FIG. 7 is a side elevational view of a discharge valve with portions broken away to reveal details thereof, the discharge valve comprising my valve insert.

A discharge valve utilizing a valve insert 10 is fully described in my co-pending utility patent application Ser. No. 12/453,452, filed on May 12, 2009, incorporated by reference for all purposes herein. FIG. 7 is provided with this specification, however, to highlight some of the functional features and operating characteristics of such a discharge valve 22 as they pertain to valve insert 10.

Discharge valve 22 includes a valve seat 24 and a reciprocating piston 26. Piston 26 has a head portion 28 for engaging valve seat 24 and a hollow, stem portion 30 extending upwardly from head portion 28. A valve guide 32 is positioned above piston 26 and has a guide rod 34 that projects downwardly into a longitudinal socket 36 in stem portion 30. A number of radial apertures 38 penetrate the bottom of stem portion 30. A compressed spring 40 is disposed between the valve guide 32 and head portion 28 to normally press head portion 28 into engagement with seat 24. A valve retainer 42 is screwed into a pump (not shown) to retain valve 22 therein.

Valve seat 24 is a hollow cylinder with an inner wall 44. Wall 44 has a top part 44t that slopes downwardly and inwardly toward center of seat 24. Wall 44 also has a bottom part 44b that slopes upwardly and inwardly. Finally, wall 44 has a substantially vertical, middle part 44m that connects the bottom of top part 44t to the top of bottom part 44b.

Valve seat 24 has an outer wall 46 that snugly engages the pump within which valve 22 is positioned. Outer wall 46 slopes downwardly an inwardly at a shallow angle. A pair of peripheral channels 48, 50 is provided around the middle of wall 46. Within each of channels 48, 50 is positioned an o-ring seal 52, 54. Projecting from the top of outer wall 46 is a peripheral flange 56. The bottom of flange 56 slopes downwardly and inwardly toward outer wall 46.

Head portion 28 includes a bottom part 28b and a rim part 28r that extends upwardly and outwardly from the periphery of bottom part 28b. Bottom part 28b is conical with a rounded bottom wall 58 and a side wall 60 that extends upwardly and outwardly from bottom wall 58. Rim part 28r, however, has a side wall 62 that projects upwardly and outwardly from the top of side wall 60 so as to permit flush positioning of rim part 28r against top part 44t of seat 24. Rim part 28r projects above bottom part 28b so as to define a circular recess 64 in the top of head portion 28.

Stem portion 30 extends upwardly from the center of recess 64 within spring 40. Stem portion 30 is integrally formed with head portion 28 and has an exterior diameter that decreases gradually from its bottom within recess 64 to its top positioned above rim part 28r. The top of stem portion 30 abuts valve guide 32. Socket 36 extends downwardly through the center of stem portion 30 and into the center of rim part 28r. The bottom of stem portion 30 has a peripheral, downwardly and outwardly sloping ledge 66. Piston 26 has apertures 38 that extend outwardly from socket 36.

Side wall 62 of rim part 28r is provided with a peripheral recess 68 that snugly receives a valve insert 10, serving as a principal, sealing element for valve 22. Recess 68 has a back edge 70, remote from side wall 62, which is generally circular in cross section. The top wall 14, flanked by inside wall 12 and wing wall 16, correspond in terms of shape to that of back edge 70 so as to "snap fit" into recess 68. Insert 10 is easy to press into head portion 28 and has little tendency to loosen over time.

Valve guide 32 includes a circular plug 72 having a circular, vertical, side wall 74 and a circumferential flange 76 projecting outwardly from the top of side wall 74. To prevent fluid leaks around plug 72, side wall 74 is provided with a pair of peripheral grooves 78, 80 beneath flange 76 within which are positioned o-ring seals 82, 84.

Plug 72 has a circular recess 86 in the bottom thereof. Recess 86 is centered on the longitudinal axis of valve 22. A circular platform 88 extends downwardly from the center of recess partially toward the bottom of plug 72.

A cylindrical, guide rod 34 is integrally formed with plug 72. Guide rod 34 is smaller in diameter than platform 88 and extends downwardly from the center of platform 88 so as to be slidably received within socket 36 of stem portion 30.

Projecting from the top of plug 72 is a cylindrical sleeve 90 with an interiorly threaded socket 92. Sleeve 90 is used in a conventional manner to lift valve guide 32.

Valve retainer 42 includes a circular cap 94 having a helically threaded side wall 96 that permits retainer 42 to be screwed into a pump. To facilitate the turning of retainer 42, a polygonal pin 98 of hexagonal cross section is affixed to, and extends upwardly from, the top of cap 94. A cylindrical cutout 100 is provided in the bottom of cap 94 to loosely receive sleeve 90. In use, the bottom of cap 94 presses downwardly upon the top of plug 72.

After installing discharge valve 22 in a pump, a plunger (not shown) is reciprocated in a pumping chamber beneath valve seat 24. As the plunger moves forward to drive pressurized fluid through seat 24, the compressive force of spring 40 is overcome and piston 26 is elevated to the position shown in FIG. 7. With head portion 28 being disengaged from seat 24, fluid flows past seat 24. A discharge port (not shown) in the pump conveys pressurized fluid from valve 22. When the plunger travels back to its starting point, the fluid pressure is reduced within seat 24 such that the compressive force of spring 40 drives side wall 62 and insert 10 onto top part 44*t* of seat 24 thereby preventing substantial volumes of fluid from traveling back from valve 22 into the pumping chamber of the pump. The process of opening and closing valve 22 is automatic and can be accomplished many times a second.

Figure 8:
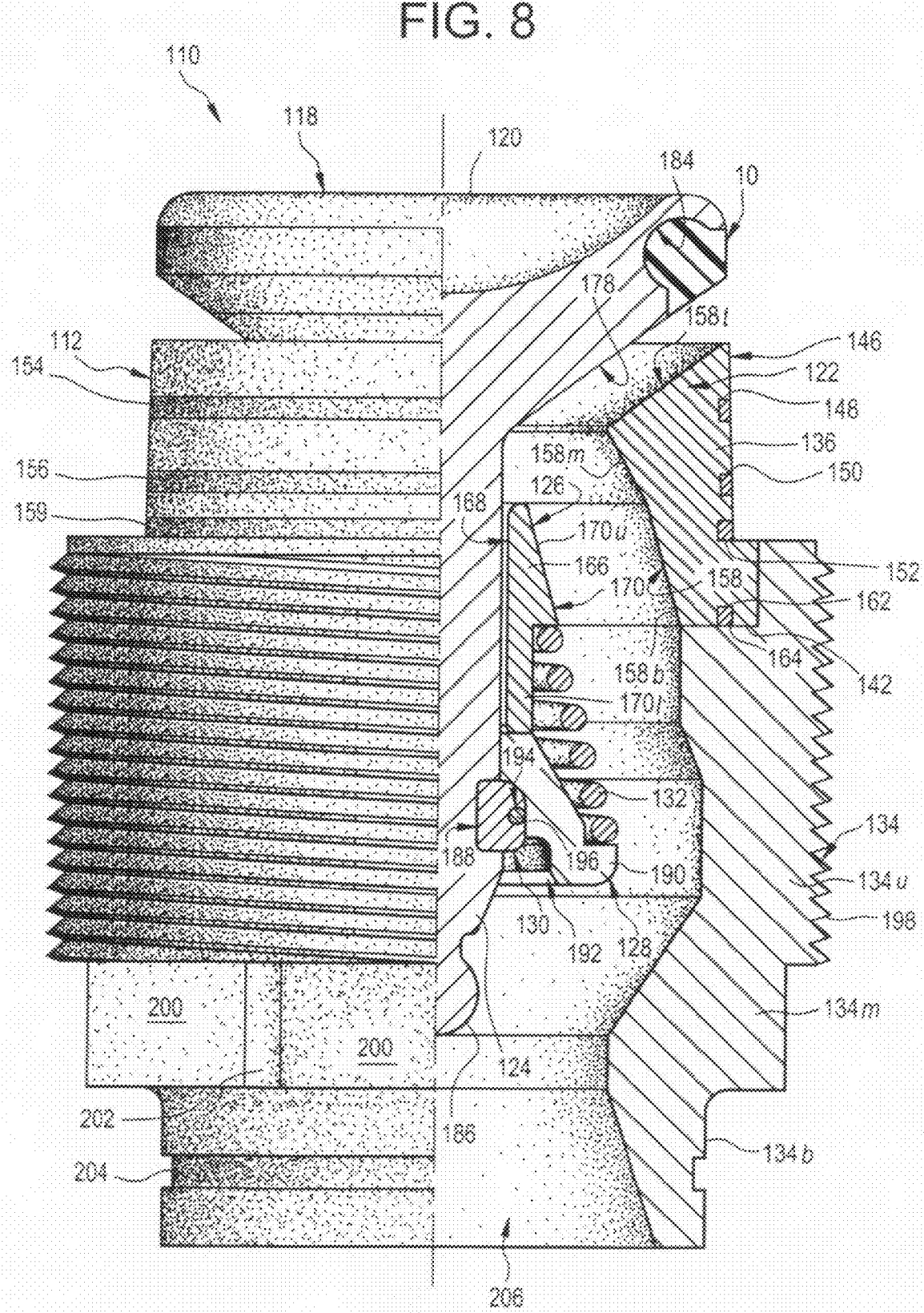
FIG. 8 is a side elevational view of a suction valve with portions broken away to reveal details thereof, the suction valve comprising my valve insert.

A suction valve utilizing valve insert 10 is fully described in my co-pending utility patent application Ser. No. 12/453,461, filed on May 12, 2009, incorporated by reference for all purposes herein. However, FIG. 8 is provided herewith to briefly review and highlight some of the functional features and operating characteristics of a suction valve of the type illustrated in the '461 application as they pertain to valve insert 10.

Suction valve 110 includes a valve seat and guide assembly 112 for positioning in a pump (not shown) and a piston 118 that moves within assembly 112. Piston 118 has a head 120 for engaging the seat portion 122 of assembly 112 and a stem 124 extending downwardly from head 120 through the guide portion 126 of assembly 112. A valve keeper 128 is fitted upon the bottom of stem 124 and is retained there by a split ring 130. A compressed spring 132 is positioned between guide portion 126 and keeper 128 for normally retaining head 120 in engagement with seat portion 122 to prevent fluid flow through valve 110. A valve retainer 134 is screwed into the pump to retain the balance of valve 110 within the pump and provide for the attachment of valve 110 to a fluid source.

Seat portion 122 comprises an outer ring 136 and an outwardly projecting peripheral flange 142 that is integrally formed with outer ring 136. Outer ring 136 has an outer surface 146 that slopes upwardly an inwardly at a shallow angle. A number of peripheral channels 148, 150, and 152 are provided around outer surface 146 at spaced-apart intervals. Within channels 148, 150 and 152 are positioned o-ring seals 154, 156 and 159, respectively. Outer ring 136 also has an inner surface 158 that is shaped to reduce turbulence in fluid moving through valve 110. Inner surface 158 has a top part 158*t* that is beveled such that it slopes downwardly and inwardly toward the center of seat portion 122. Inner surface 158 also has a bottom part 158*b* that slopes upwardly and inwardly. Connecting bottom part 158*b* and top part 158*t* together, inner surface 158 has a medial part 158*m* that slopes upwardly and inwardly.

Peripheral flange 142 extends outwardly from the bottom of outer ring 136. The top of flange 142 snugly engages the pump thereby ensuring a strong platform for assembly 112. To ensure against fluid leaks around valve 110, the bottom of flange 142 is provided with a peripheral groove 162 that receives an o-ring seal 164 for engaging valve retainer 134.

Guide portion 126 includes an inner ring 166 that slidably receives stem 124 of piston 118. Inner ring 166 has an interior wall 168 for engaging stem 124 and an opposed exterior wall 170. Exterior wall 170 has an upper part 170*u* and a lower part 170*l* of smaller diameter and substantially equal height. A shoulder 172 is provided at the junction of the upper and lower parts 170*u* and 170*l* that serves as an abutment for the top of spring 132. Upper part 170*u* is positioned within seat portion 122 adjacent flange 142 and tapers upwardly and inwardly. Lower part 170*l* projects outwardly from the bottom of seat portion 122.

Inner ring 166 and outer ring 136 are connected together by three, vertically oriented fins (not shown). These fins radiate outwardly from upper part 170*u* of exterior wall 170 of inner ring 166 to join bottom part 158*b* of outer ring 136.

Head 120 has a beveled, peripheral edge 178 that is adapted to snugly engage top part 158*t* of seat portion 122. Extending around edge 178 is a recess 184 that is generally circular in cross section and is further shaped to snugly receive valve insert 10 that serves as sealing element for valve 110. The top wall 14, flanked by inside wall 12 and wing wall 16, correspond in terms of shape to that of recess 184 so as to "snap fit" into recess 184. Insert 10 is easy to press into head portion 120 and has little tendency to loosen over time.

Stem 124 has a spherical knob 186 at its bottom end. The diameter of knob 186 is smaller than the diameter of stem 124 to easily fit through inner ring 166.

Above knob 186, stem 124 is provided with a peripheral groove 188. Groove 188 is shaped so as to positively grip a correspondingly shaped split ring 130 and keep split ring 130 from springing outwards during use of valve 110.

Valve keeper 128 is fitted over the bottom of stem 124 and has a conical configuration. Keeper 128 has an exterior diameter that increases gradually from its top, where it has the same diameter as exterior wall 170*l* of inner ring 166, to its bottom. Extending outwardly from the bottom of keeper 128 is a peripheral rim 190 that serves as an abutment for the bottom of spring.

A recess 192 is provided in the bottom of keeper 128 for snugly receiving split ring 130 that is fitted into groove 188. To ensure that split ring 130 does not slide from recess 192, split ring 130 is provided with a peripheral groove 194 at its midpoint into which is fitted an o-ring 196.

Valve retainer 134 is segmented, hollow, and cylindrical. The upper segment 134*u* of retainer 134 is provided with external, helical threads 198 that screw tightly into a pump.

Valve retainer 134 has a middle segment 134*m* that is joined to the bottom of upper segment 134*u*. Middle segment 134*m* has a polygonal cross section with six, principal, external faces 200 separated by six, secondary, external faces 202 hexagonally arranged. Faces 200 can be gripped by a wrench for rotating valve retainer 134.

Valve retainer 134 has a bottom segment 134*b* that is joined to the bottom of middle segment 134*m*. Bottom segment 134*b* is circular in cross section and has a peripheral slot 204 around the middle thereof. Slot 204 accommodates a coupling (not shown) for the quick and easy connection of valve retainer 134 to a fluid source.

Valve retainer 134 has a segmented passageway 206 that conveys fluid through segments 134*u*, 134*m*, and 134*b* into assembly 112.

After the installation of suction valve 110 in a pump, a plunger (not shown) is reciprocated above head 120. As the plunger moves forward to drive fluid from a pumping chamber, the peripheral edge 178 of head 120 and valve insert 10 carried thereon are snugly pressed under the influence of spring 132 against top surface 158*t* of seat portion 122 ensuring that no fluid leaks through valve 110. When the plunger travels back to its starting point, a partial vacuum is created that lifts piston 118 against the compressive force of spring 132 and draws fluid upwardly through valve 110. The process of opening and closing valve 110 is entirely automatic and requires mere fractions of a second to accomplish.

While valve insert 10 has been described with a high degree of particularity, it will be appreciated by those skilled in the art that modifications can be made to it. Therefore, it is to be understood that my invention is not limited solely to valve insert 10, but encompasses any and all valve insert embodiments within the scope of the following claims.

I claim:

1. A valve insert, comprising:
    a ring, made of a resilient material, having shape is defined by the rotation of an irregular polygon around a central axis, said irregular polygon is formed by superposing a quadrilateral and a circle wherein:
        said quadrilateral is a plane figure including:
            a first side being connected to a second side at a first interior angle;
            a third side being connected to said second side at a second interior angle;
            a fourth side being connected to said third side at a third interior angle;
            said fourth side being connected to said first side at a fourth interior angle;
            said first side being longer than said fourth side;
            said fourth side being longer than said second side;
            said second side being longer than said third side;
            said first interior angle and said second interior angle both being right angles;
            said third interior angle being an obtuse angle; and,
            said fourth interior angle being an acute angle;
        said circle is a plane figure including a center and a radius, and said radius being shorter than said third side of said quadrilateral;
        said center of said circle being positioned within said quadrilateral;
        said circle crossing said first side and said second side.

* * * * *